United States Patent
Weng et al.

(10) Patent No.: US 7,729,605 B2
(45) Date of Patent: Jun. 1, 2010

(54) AUTO-FOCUSING CAMERA

(75) Inventors: Cheng-Fa Weng, Taipei Hsien (TW); Huai-Chao You, Shenzhen (CN); Jen-Te Wang, Taipei Hsien (TW); Ching-Hsing Huang, Taipei Hsien (TW)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 334 days.

(21) Appl. No.: 11/967,094

(22) Filed: Dec. 29, 2007

(65) Prior Publication Data

US 2009/0080877 A1    Mar. 26, 2009

(30) Foreign Application Priority Data

Sep. 21, 2007 (CN) .................. 2007 1 0077334

(51) Int. Cl.
G03B 3/10 (2006.01)
G03B 17/00 (2006.01)

(52) U.S. Cl. ........................................ 396/133; 396/75

(58) Field of Classification Search .................. 396/73, 396/74, 75, 83, 133, 144
See application file for complete search history.

(56) References Cited

U.S. PATENT DOCUMENTS

| 7,039,309 | B2 | 5/2006 | Hsiao | |
| 7,359,631 | B2* | 4/2008 | Naka et al. | 396/79 |
| 7,430,368 | B2* | 9/2008 | Lee | 396/76 |
| 2007/0280667 | A1* | 12/2007 | Shin | 396/133 |
| 2008/0118239 | A1* | 5/2008 | Hsiao et al. | 396/133 |
| 2008/0225415 | A1* | 9/2008 | Bogue et al. | 359/824 |

* cited by examiner

*Primary Examiner*—Rodney E Fuller
(74) *Attorney, Agent, or Firm*—Jeffrey T. Knapp

(57) ABSTRACT

An auto-focusing camera includes a stator (20), a rotor (30) rotatably disposed in the stator, and a lens unit (40) received in the rotor. The stator includes a stator core (23) and coils (25) winding on the stator core. The rotor is a permanent magnet (32) securely mounted around the lens unit. The lens unit forms three ears (414) at a bottom thereof, and a wave-shaped surface (220) is formed on a top of an inner, bottom flange (22) of the stator. The ears abut the wave-shaped surface. The ears of the lens unit move along the wave-shaped surface during rotation of the rotor and the lens mount, and thus the lens unit moves telescopically along an axial direction thereof.

20 Claims, 7 Drawing Sheets

AUTO-FOCUSING CAMERA

BACKGROUND OF THE INVENTION

1. Field of the Invention

The present invention relates generally to a lens drive mechanism of a camera, and more particularly to a lens drive mechanism of an auto-focusing camera.

2. Description of Related Art

Usually we need a camera to record the memorable moments. The designs of cameras have evolved toward lightweight and compactness, so have the currently popular digital cameras. Conventionally, an auto focus structure is used for controlling the telescopic movement of a lens of the camera.

The auto focus structure of the camera focuses on an object by comparing with the image on an image sensor. The image sensor is either a charge coupled device (CCD) sensor or a complementary metal oxide semiconductor (CMOS) sensor, and is controlled by a central processing unit (CPU) installed inside the digital camera. In the beginning, the lens moves back and forth around its original position (static position). As the lens moves, the CPU compares the image from the lens with the image in the image sensor. Finally, as the lens moves to the position where the image is the clearest, then the lens stops at the position. In this case, the lens has to be continuously driven back and forth by an annular cam. The annular cam is provided with a lens driving structure and driven to rotate by a stepping motor. At the moment when the CPU detects the clearest image as the lens moves back and forth, a stop signal is simultaneously sent to the lens. Therefore, the lens stops at the best focal position (static position). When the lens is to be moved back to the original position, the annular cam starts to rotate again. Once the lens moves back to its original position, the photo interrupter installed by the lens cylinder uses the shutter at the border of the lens cylinder to detect the original position of the lens. The shutter will interrupt the light of the penetration-type photo interrupter. The lens stops at the moment when the photo interrupter detects the original position.

Consequently, the lens in a digital camera auto focus system has to be driven continuously, so is the image detection. Every time an image is captured, the lens has to return to its original position. This method of searching for an optimal focal point makes use of mechanical and continuous lens motion to repeatedly check the image. Thus, the lens focusing procedure is very time-consuming, which, in most of cases, results in losing the best image-capturing time.

SUMMARY OF THE INVENTION

According to a preferred embodiment of the present invention, an auto-focusing camera includes a stator, a rotor rotatably disposed in the stator, and a lens unit received in the rotor. The rotor is a permanent magnet fixedly surrounds the lens unit, whereby the lens unit is movable with the rotor. The stator includes a stator core and coils winding on the stator core. The lens unit forms three ears at a bottom thereof. Each ear has an arc-shaped bottom surface. The stator has a base forming an inwardly extending flange. A wave-shaped surface is defined on a top of the flange. The ears of the lens unit abut and move along the wave-shaped surface during operation of the camera when the rotor is magnetically interacted with the stator to rotate. Thus, the lens unit moves telescopically along an axial direction thereof.

Other advantages and novel features of the present invention will be drawn from the following detailed description of a preferred embodiment of the present invention with attached drawings, in which:

BRIEF DESCRIPTION OF THE DRAWINGS

Many aspects of the present auto-focusing camera can be better understood with reference to the following drawings. The components in the drawings are not necessarily drawn to scale, the emphasis instead being placed upon clearly illustrating the principles of the present auto-focusing camera. Moreover, in the drawings, like reference numerals designate corresponding parts throughout the several views.

DETAILED DESCRIPTION OF THE INVENTION

Figure 1:
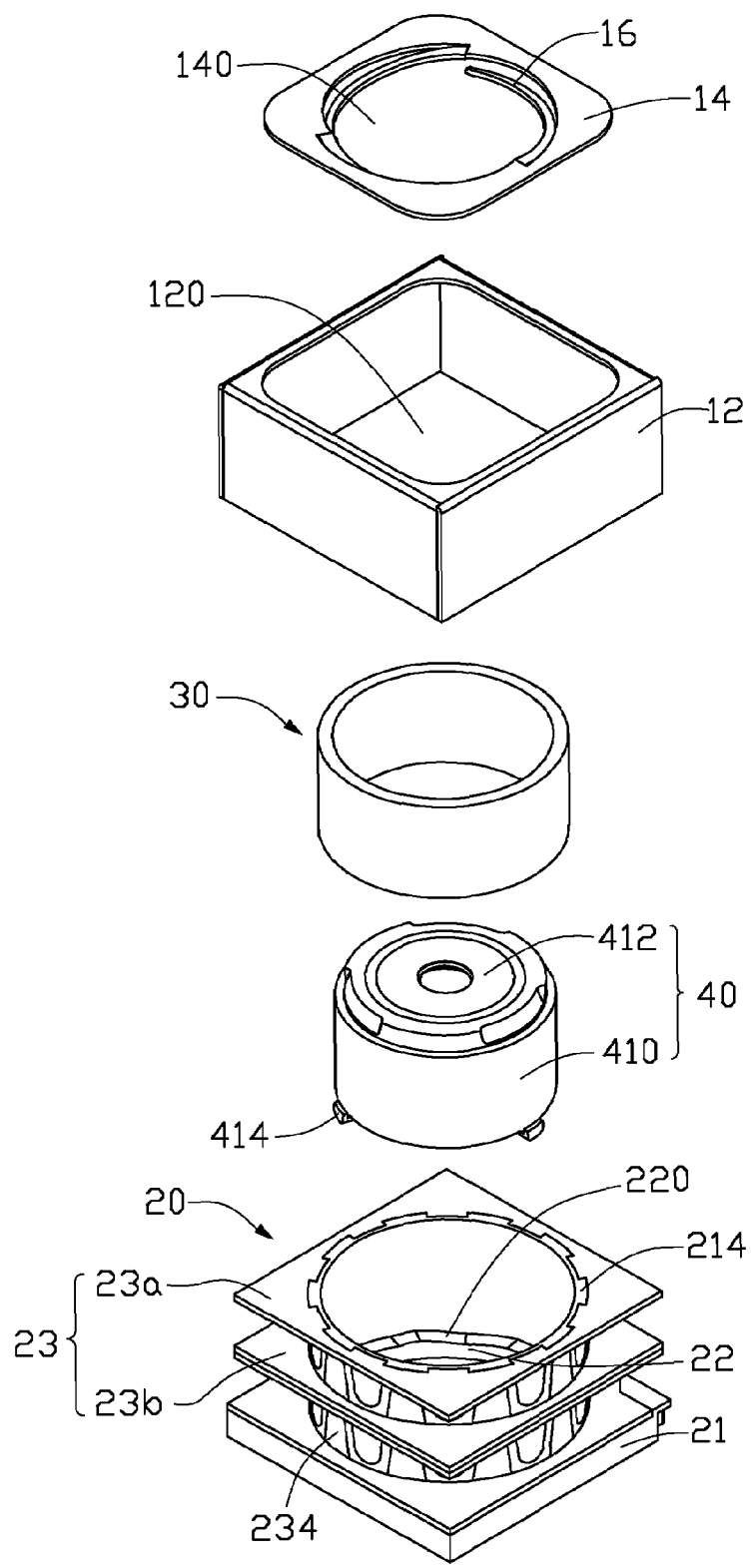
FIG. 1 is an isometric, explored view of an auto-focusing camera according to a preferred embodiment of the present invention.
Figure 2:
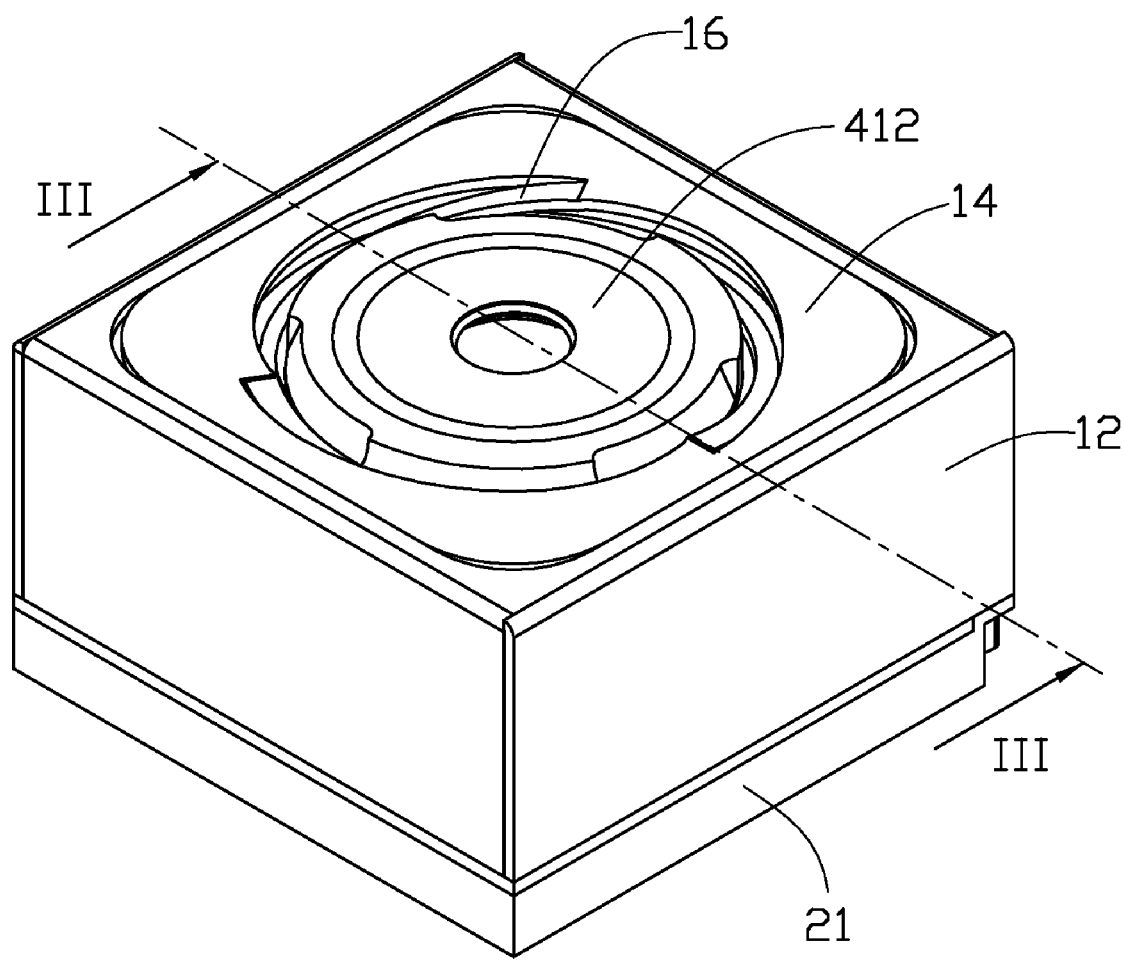
FIG. 2 is an assembled view of the auto-focusing camera of FIG. 1.
Figure 3:
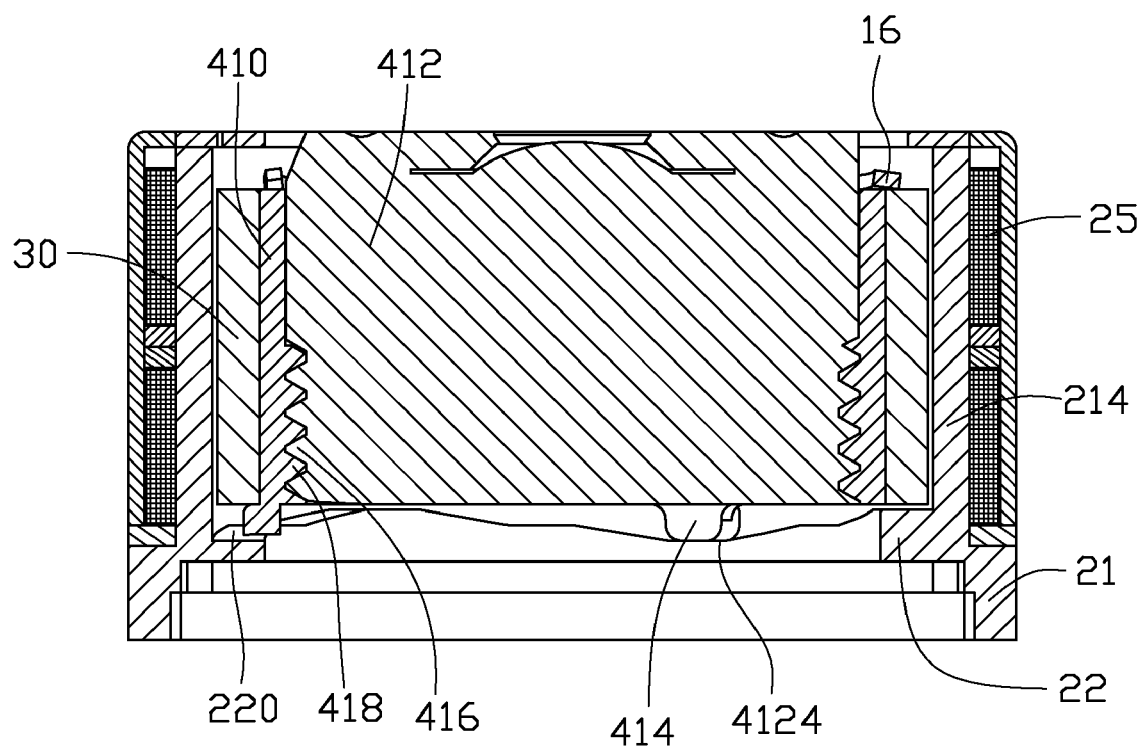
FIG. 3 is a cross-sectional view of the auto-focusing camera taken along line III-III of FIG. 2.

Referring to FIGS. 1-3, an auto-focusing camera according to a preferred embodiment includes a lens mount 12, a motor (not labeled) received in the lens mount 12, and a lens unit 40 driven by the motor.

The lens mount 12 is a hollow, rectangular prism with top and bottom ends thereof being open; an inner space 120 is thus defined in the lens mount 12 receiving the lens unit 40 and the motor therein. A cover 14 is mounted on the top end of the lens mount 12. The cover 14 defines a circular opening 140 in a center thereof for movement of the lens unit 40 during operation. Three spiral strips 16 extend downwardly and inwardly from an inner surface of the cover 14. The strips 16 are evenly spaced from each other.

Figure 4:
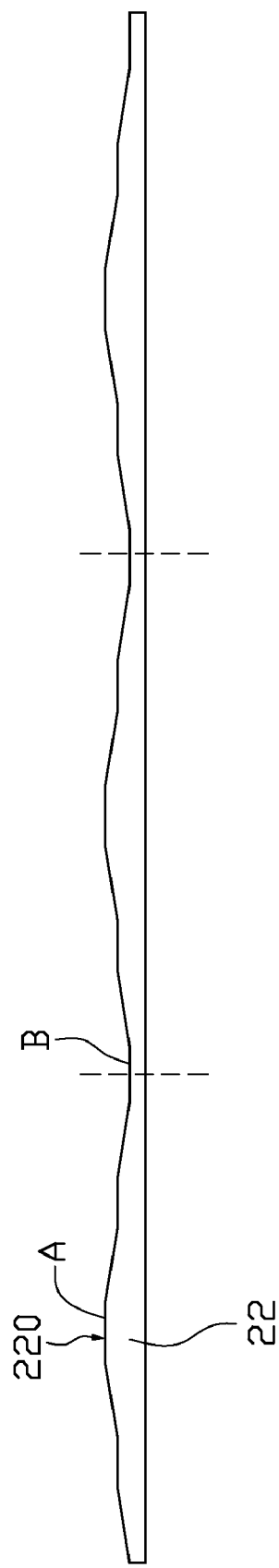
FIG. 4 is an enlarged, unfurled view of a supporting step of the auto-focusing camera.

The motor includes a stator 20 and a rotor 30 rotatably disposed in the stator 20. The stator 20 includes a base 21, a stator core 23, and coils 25 wound around the stator core 23. The base 21 has a flange 22 extending radially and inwardly from a top end thereof, and a cylinder 214 extending perpendicularly and upwardly from a top side of the flange 22. An inner diameter of the cylinder 214 is larger than that of the flange 22. Referring to FIG. 4, the flange 22 has a top surface 220 being wave-shaped, which includes three identical sections (not labeled) along a circumference of the flange 22. Each section of the wave-shaped top surface 220 has a wave crest, such as portion A, with a level higher than other portions of the section, and a wave trough, such as portion B, with a level lower than other portions of the section.

The stator core 23 is mounted around the cylinder 214, and includes two poles stacked together. Each of the poles includes an upper yoke 23a and a lower yoke 23b having claws 234 (not labeled) intermeshed with each other. The claws 234 of each yoke 23a (23b) extend perpendicularly and downwardly (upwardly) from an inner periphery thereof. The claws 234 of each yoke 23a, 23b are evenly spaced from each other along a circumferential direction thereof, and thus define a plurality of slots therebetween receiving the claws 234 of the other yoke 23b, 23a therein. The claws 234 of the two yokes 23a, 23b are alternatively arranged along the circumferential direction and thus form a cylindrical mounting wall. The coils 25 wind around the mounting wall formed by the yokes 23a, 23b.

The rotor 30 is a permanent magnet mounted in the cylinder 214 of the base 21 and is located over the flange 22 of the base 21. An outer diameter of the rotor 30 is a little smaller than the inner diameter of the cylinder 214, and an inner diameter of the rotor 30 is approximately the same as the inner diameter of the flange 22. The rotor 30 is fixedly adhered to an outer surface of the lens unit 40. The lens unit 40 is approximately cylindrical-shaped and has an outer diameter being approximately the same as the inner diameter of the rotor 30. The lens unit 40 includes a cylindrical lens barrel 410, and a lens 412 received in the lens barrel 410. An internal thread 418 is formed on an inner surface of the lens barrel 410, and an external thread 416 threadedly engage with the internal thread 418 is formed on an outer surface of the lens 412. Thus the lens 412 can be easily and precisely assembled in a required initial position by adjusting relative position of the lens 412 to the lens barrel 410 when the lens 412 is screwed in the lens barrel 410 to form the lens unit 40.

Three ears 414 extend downwardly and then outwardly from a bottom end of the lens barrel 410. The three ears 414 are equidistantly spaced from each other. A bottom surface 4124 of the ear 414 is arc-shaped. Outer ends of the three ears 414 are located on a circle which is concentric with the lens unit 40. A diameter of the circle defined by the three ears 414 is not larger than the inner diameter of the cylinder 214, and is larger than the inner diameter of the flange 22. A height of each ear 414 along an axial direction of the lens unit 40 is not smaller than a height difference between the wave crest and the wave trough of the top surface 220 of the flange 22.

When assembled, the lens mount 12 is arranged on an outer periphery of the base 21, and thus an interspace is defined between the cylinder 214 and the lens mount 12. The stator core 23 with the coils 25 wound thereon is arranged in the interspace. Alternatively, the stator core 23 can be previously fixedly assembled to the cylinder 214 during process of molding the base 21. In this situation, firstly, the yokes 23a, 23b are assembled to form the stator core 23. The stator core 23 is then mounted in a mold which is used for making the base 21. The mold has a chamber for injecting molten plastic, such as LCP (Liquid Crystal Polymer) thereinto. After cooling the molten plastic in the chamber forms the base 21 which has the flange 22 and the cylinder 214, and the plastic also fills into holes defined between the claws 234 of the poles of the stator core 23. The stator core 23 is thus fixedly adhered to an outer surface the cylinder 214, and the stator 20 and the base 21 are integral. Then the coils 25 winds on the stator core 23 to form the stator 20 of the motor. The lens unit 40 with the rotor 30 fixedly mounted therearound is then received in the cylinder 214 of the stator 20. The ears 414 directly abut the top surface 220 of the flange 22 of the base 21, and the rotor 30 is spaced from the flange 22 of the base 21. The cover 14 is mounted on the lens mount 12 with the strips 16 abutting the lens barrel 410. Thus the auto-focusing camera is assembled.

During operation, currents are applied to the coils 25 of the motor. The rotor 30 is driven to rotate by the interaction of the alternating magnetic field established by the stator 20 and the magnetic field of the rotor 30. As the lens unit 40 and the rotor 30 are fixedly connected together, the lens unit 40 rotates with the rotor 30. The ears 414 of the lens unit 40 move on the top surface 220 of the flange 22 along the circumferential direction thereof. As the top surface 220 of flange 22 is wave-shaped, a height of the top surface 220 varies along the circumferential direction. The ears 414 abutting the top surface 220 of the flange 22 have a height varying during the rotation of the rotor 30. Thus a height of the lens unit 40 and the rotor 30 supported by the ears 414 varies during rotation of the rotor 30 and the lens unit 40. In other words, during operation of the camera, the lens unit 40 and rotor 30 rotate and moves telescopically at the same time. As mentioned earlier, the top surface 220 of the flange 22 forms three identical sections, and thus has three wave crests and three wave troughs. Each wave crest corresponds to a position of the front focal point of the camera, and each wave trough corresponds to a position of the rear focal point of the camera. Thus the lens unit 40 has six focal points when the rotor 30 rotates through a whole circle. The lens unit 40 has not to return to its original position before searching for the other focal point. Thus the lens focusing procedure is convenience and very timesaving.

As the height of the ears 414 are larger than the height difference between the wave crest and the wave trough of the top surface 220 of the flange 22, only the arc-shaped bottom surfaces 4124 of the ears 414 contact the top surface 220 of the flange 22 when the rotor 30 and the lens unit 40 are rotated. The lens unit 40 and the rotor 30 are always spaced from the top surface 220 of the flange 22 during operation of the camera. The arc-shaped bottom surfaces 4124 of the ears 414 and the top surface 220 of the flange 22 form point contact. Thus, the ears 414 and the top surface 220 of the flange 22 have a small contacting area and a small friction therebetween accordingly. Furthermore, as the number of the ears 414 and the sections of the waves-shaped to surface 220 of the top surface 220 are the same, the ears 414 are at the same level at any time. Thus swing of the lens unit 40 is avoided, and so that the lens unit 40 can have a stable and smooth rotation and movement relative to the stator 20. It is to be understood that the number of the ears 414 and the sections of the wave-shaped top surface 220 of the flange 22 can be change, such as five, and in this situation, the top surface 220 of the flange 22 has five wave crests and five wave troughs. The lens unit 40 has ten focal points when the rotor 30 rotates through a whole circle. The number of the ears 414 are designed corresponding to the number of the sections of the top surface 220, thus to maintain the ears 414 at the same level and keep the lens unit 40 from swing. In addition, the number of the sections of the wave-shaped top surface 220 of the flange 22 can be an integral multiple of the number of the ears 414, such as double or three times, as long as the ears 414 are located at the same level during rotation of the rotor 30 and the lens unit 40.

Figure 5:
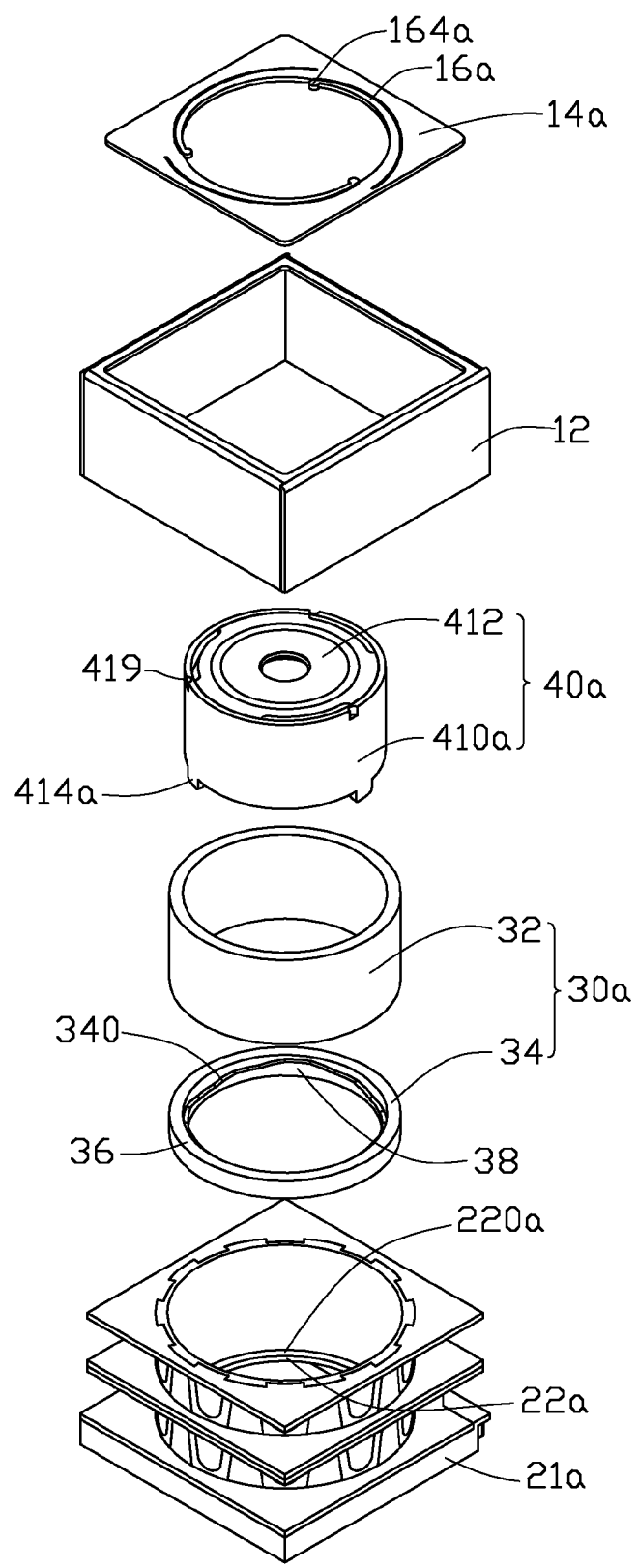
FIG. 5 shows an exploded, isometric view of the auto-focusing camera according to a second embodiment of the present invention.
Figure 6:
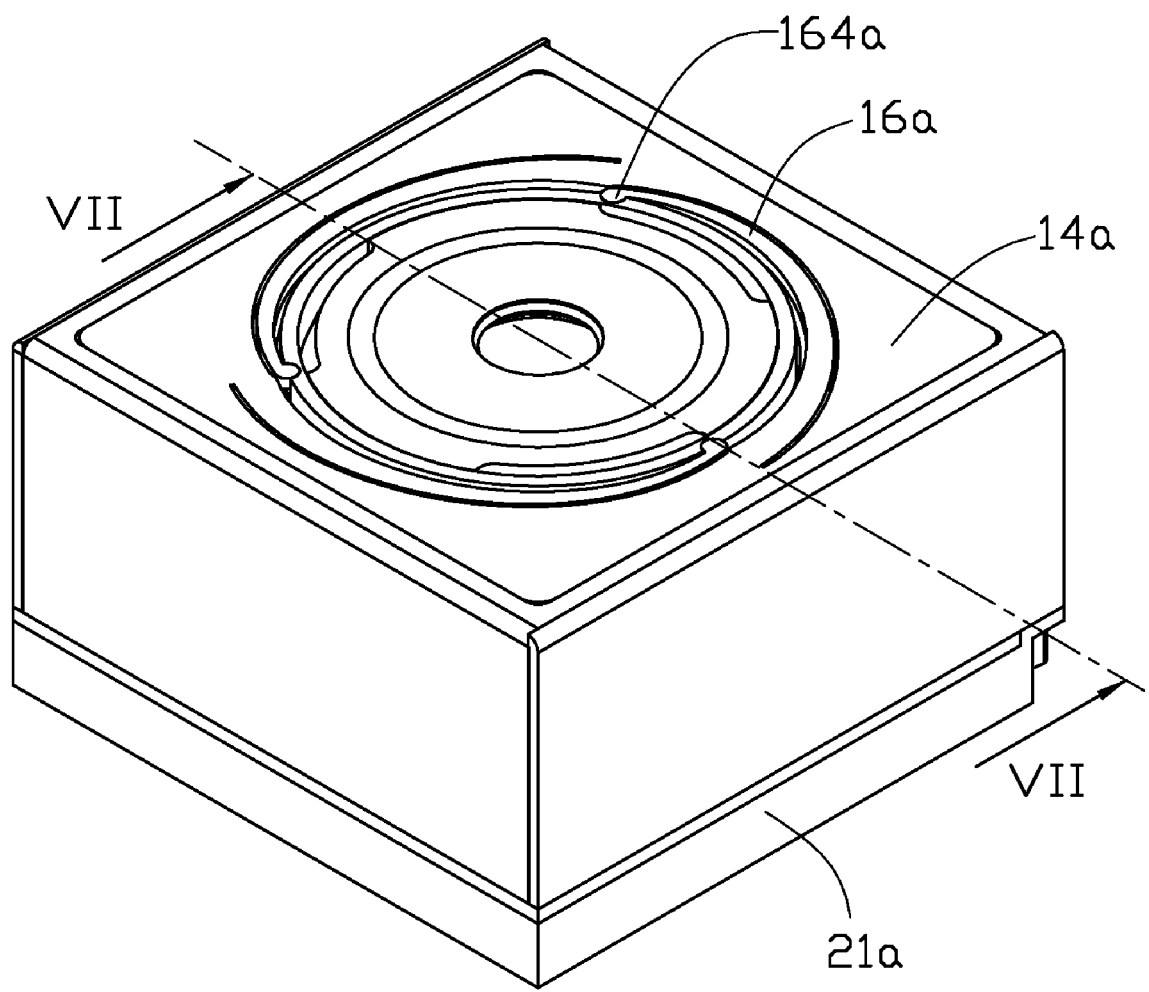
FIG. 6 is an assembled view of the auto-focusing camera of FIG. 5.
Figure 7:
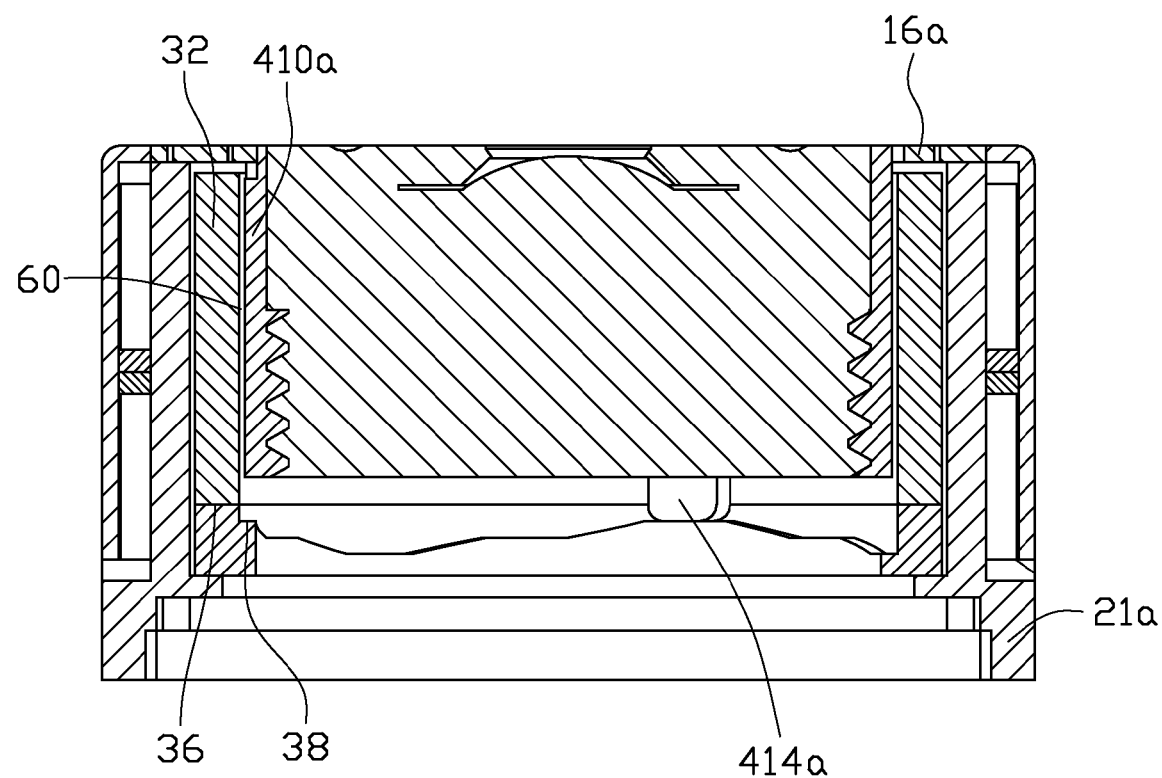
FIG. 7 is a cross-sectional view of the auto-focusing camera taken along line VII-VII of FIG. 6.

FIGS. 5-7 show an alternative embodiment of the auto-focusing camera. The difference of the auto-focusing camera of this embodiment over the first embodiment is that the top surface 220a of the flange 22a of the base 21a is planar-shaped, and the rotor 30a includes a magnet 32 and a supporting member 34 forming the wave-shaped surface 340. The supporting member 34 is arranged on the flange 22a of the base 21a. The supporting member 34 includes an outer ring 36 and an inner ring 38 extending inwardly from a bottom of the outer ring 36. A top surface of the outer ring 36 is planar-shaped, and the inner ring 38 forms the wave-shaped top surface 340. An outer diameter of the outer ring 36 of the supporting member 34 is approximately the same as that of the magnet 32, and an inner diameter of the outer ring 36 is the same as than that of the magnet 32. An inner diameter of the inner ring 38 is smaller than that of the magnet 32, and is smaller than that of the circle cooperatively defined by the ears 414a of the lens unit 40a. When assembled, the magnet 32 is fixedly connected to a top of the outer ring 36 of the supporting member 34, whereby when the magnet 32 rotates, the supporting member 34 rotates accordingly. The lens unit 40a is arranged on the inner ring 38 of the supporting member 34, with the ears 414a contacting the top surface 340 of the inner ring 38. A narrow gap 60 is defined between the outer surface of the lens unit 40a and an inner surface of the magnet 32. During operation, the magnet 32 and the supporting member 34 rotate, and the top surface 340 of the inner ring 38 rotates accordingly. Thus the ears 414a of the lens unit 40a moves relatively along the top surface 340 of the inner ring 38 of the supporting member 34. The lens unit 40a moves telescopically. Furthermore, each of the strips 16a of the cover 14a forms a button 164a at a free end thereof, and the lens barrel 410a defines a plurality of recesses 419 receiving the buttons 164a therein.

While the auto-focusing cameras have been described having the rotor 30a or the stator 20 forming the wave-shaped surfaces 340, 220 and the lens units 40, 40a forming the ears 414, 414a moving relative to the wave-shaped surfaces 220, 340, the lens unit 40, 40a can move telescopically. Conversely, the wave-shaped surface 220, 340 can be formed on a bottom of the lens unit 40, 40a, and thus the rotor 30a, or the stator 20 can form the ears 414, 414a thereon. During operation of the camera, the wave-shaped surface moves relative to the ears, and thus the lens unit moves telescopically along the axial direction thereof. It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. An auto-focusing camera comprising:
   a stator having a stator core and coils winding on the stator core;
   a rotor being rotatably disposed in the stator, the rotor comprising a permanent magnet; and
   a lens unit received in the rotor with the magnet of the rotor mounted therearound;
   wherein the lens unit forms at least one ear, and one of the stator and the rotor forms a wave-shaped surface against which the at least one ear abuts, the at least one ear of the lens unit moving along the wave-shaped surface during operation of the camera when the stator magnetically interacts with the rotor, and thus the lens unit moving telescopically along an axial direction thereof.

2. The auto-focusing camera of claim 1, wherein the lens unit forms a plurality of ears thereon, and the wave-shaped surface forms a plurality of identical sections, a number of the sections being an integral multiple of that of the ears.

3. The auto-focusing camera of claim 2, wherein the auto-focusing camera is a two-step focusing camera, and each section has a wave trough and a wave crest, the ears of the lens unit at the wave crests corresponding to a position of a front focal point of the camera, and the ears of the lens unit at the wave troughs corresponding to a position of a rear focal point of the camera.

4. The auto-focusing camera of claim 1, wherein the stator comprises a base having a flange extending inwardly thereof and a cylinder extending upwardly from the flange, the stator core with the coils being mounted around the cylinder.

5. The auto-focusing camera of claim 4, wherein the wave-shaped surface is formed on a top surface of the flange, the rotor being arranged on the flange and being fixedly connected to the lens unit and moving with the lens unit.

6. The auto-focusing camera of claim 4 further comprising a lens mount arranged on an outer periphery of the base of the stator, the stator core being arranged between the cylinder of the stator and the lens mount.

7. The auto-focusing camera of claim 1, wherein the rotor comprises a supporting member forming the wave-shaped surface in an inner periphery thereof, and the magnet is fixed to the supporting member and is spaced from the lens unit.

8. The auto-focusing camera of claim 1, wherein the lens unit comprises a lens barrel and a lens received in the lens barrel, the at least one ear extending from a bottom of the lens barrel and forming an arc-shaped bottom surface contacting the wave-shaped surface.

9. The auto-focusing camera of claim 8, wherein a cover is arranged on the lens unit with an opening defined in a center thereof for extension of the lens unit, a plurality of spiral strips extending downwardly from an inner periphery of the cover and abutting the lens barrel.

10. An auto-focusing camera comprising:
    a motor comprising a stator and a rotor being rotatably disposed in the stator, the stator having a stator core and coils winding on the stator core, the rotor comprising a permanent magnet; and
    a lens unit received in the rotor with the magnet of the rotor mounted therearound;
    wherein one of the motor and the lens unit forming at least one ear, and the other one of the motor and the lens unit forming a wave-shaped surface, the at least one ear moving along the wave-shaped surface during operation of the camera when the rotor rotates, and thus the lens unit moving telescopically along an axial direction thereof.

11. The auto-focusing camera of claim 10, wherein the motor forms the at least one ear, and the lens unit forms the wave-shaped surface.

12. The auto-focusing camera of claim 10, wherein the lens unit forms the at least one ear, and the motor forms the wave-shaped surface.

13. The auto-focusing camera of claim 10, wherein the rotor of the motor is fixedly connected with the lens unit, and the stator of the motor forms the wave-shaped surface.

14. The auto-focusing camera of claim 13, wherein the stator comprises a base having a flange extending inwardly thereof and a cylinder extending upwardly from the flange, the stator core with the coils being mounted around the cylinder, a top surface of the flange forming the wave-shaped surface.

15. The auto-focusing camera of claim 10, wherein the rotor comprises a supporting member forming the wave-shaped surface in an inner periphery thereof, the magnet is fixed to the supporting member and is spaced from the lens unit.

16. An auto-focusing camera comprising:
    a lens mount;
    a stator received in the lens mount;
    a rotor mounted in the stator, wherein the rotor is magnetically interactive with the stator to cause the rotor to rotate;
    a ring having a cammed top surface; and
    a lens unit receives in the rotor and having a plurality of ears at a bottom thereof, the ears abutting the cammed top surface of the ring;
    wherein when the rotor rotates, the ears and the cammed top surface of the ring have a relative movement therebetween to cause the lens unit to have a telescopic movement relative to the lens mount.

17. The auto-focusing camera of claim 16, wherein the ring is fixed to the stator.

18. The auto-focusing camera of claim 16, wherein the ring is fixed to the rotor.

19. The auto-focusing camera of claim 17 further comprising a cover over the lens mount, the cover having strips abutting against a surface of the lens unit remote from the ears.

20. The auto-focusing camera of claim 18 further comprising a cover over the lens mount, the cover having strips abutting against a surface of the lens unit remote from the ears.

* * * * *